United States Patent [19]
Zahir et al.

[11] Patent Number: 6,052,802
[45] Date of Patent: Apr. 18, 2000

[54] APPARATUS AND METHOD FOR CYCLE ACCOUNTING IN MICROPROCESSORS

[75] Inventors: Achmed R. Zahir, Menlo Park; Vincent E. Hummel, San Jose; Ralph M. Kling, Sunnyvale; Tse-Yu Yeh, Milpitas, all of Calif.

[73] Assignee: Intel Corporation, Santa Clara, Calif.

[21] Appl. No.: 09/001,309

[22] Filed: Dec. 31, 1997

[51] Int. Cl.$^7$ .................................................. G06F 11/00
[52] U.S. Cl. ............................................. 714/47; 712/227
[58] Field of Search ................................. 714/47, 30, 38, 714/39, 28, 23; 712/227, 249, 4; 395/375, 591, 500, 701; 709/250; 364/200; 341/172; 710/131, 262; 348/594; 711/202

[56] References Cited

U.S. PATENT DOCUMENTS

| | | | |
|---|---|---|---|
| 5,187,796 | 2/1993 | Wang et al. | 712/4 |
| 5,274,717 | 12/1993 | Miura et al. | 382/41 |
| 5,305,108 | 4/1994 | Trytko | 348/594 |
| 5,530,809 | 6/1996 | Douglas et al. | 709/250 |
| 5,590,337 | 12/1996 | Rahman et al. | 710/262 |
| 5,751,945 | 5/1998 | Levine et al. | 714/47 |
| 5,797,019 | 8/1998 | Levine et al. | 710/262 |
| 5,894,575 | 4/1999 | Levine et al. | 395/704 |
| 5,896,538 | 4/1999 | Blandy et al. | 395/704 |
| 5,919,268 | 7/1999 | McDonald | 714/47 |
| 5,922,070 | 7/1999 | Swoboda | 712/244 |
| 6,000,044 | 12/1999 | Chrysos et al. | 714/47 |

*Primary Examiner*—Joseph E. Palys
*Assistant Examiner*—Rijue Mai
*Attorney, Agent, or Firm*—Blakely, Sokoloff, Taylor & Zafman LLP

[57] ABSTRACT

An apparatus and method for cycle accounting for a microprocessor are disclosed, in which a performance monitor includes a plurality of silos, a prioritizer, and a combiner. The silos receive delay reason signals from the main processor pipeline, and output staged signals. The prioritizer receives the staged signals, and outputs a plurality of prioritized signals. The combiner selectively combines various of the prioritize signals, and provides signals indicative of microprocessor performance. Each silo includes, in series, a plurality of stages, with each stage containing a single latch. The stages of the silo are synchronized with the stages of the main processor pipeline. The performance monitor operates in real-time, at the same frequency as the microprocessor, and in parallel to the main processor pipeline. Outputted signals include various signals indicative of microprocessor performance, for example, cache misses, branch mispredictions, and so forth, but only for those miss-events that contribute to a program's visible delay, thereby providing an accurate picture of where cycles are being wasted.

47 Claims, 3 Drawing Sheets

APPARATUS AND METHOD FOR CYCLE ACCOUNTING IN MICROPROCESSORS

BACKGROUND OF THE INVENTION

1. Field of the Invention

This invention relates generally to computer microprocessors. More particularly, the present invention relates to an apparatus and method for monitoring the performance of a microprocessor in real-time, at the frequency of the microprocessor.

2. Description of the Related Art

Modern computers contain microprocessors, which are essentially the brains of the computer. Modem microprocessors use a design technique called a pipeline, in which the output of one process serves as input to a second, the output of the second process serves as input to a third, and so on, often with more than one process occurring during a particular computer clock cycle. Modern computers and computer microprocessors contain a number of pipelines, and each particular pipeline contains a number of stages.

A computer program contains numerous instructions, which tell the computer what precisely it must do, to achieve the desired goal of the program. A computer runs a particular computer program by executing the instructions contained in the program. Theoretically, an instruction should complete execution in a number of computer cycles equal to the number of pipeline stages contained in the computer. If it takes longer, there should be a reason for the extra cycles. It might be that the extra cycles occur because of how the microprocessor was designed, and how the microprocessor must operate. The extra cycles might occur because of how the computer program was designed, and how the computer program operates. If the extra cycles are caused by the computer program's design, that design might be altered to eliminate or at least reduce the number of extra cycles. Such redesigning of the computer program might be done by the program designer, or might be done by a compiler or other computer program which translates a higher-level computer program into lower-level instructions that can be executed by the computer. Such fine-tuning of a computer program, so as to eliminate or reduce extra cycles, requires identifying the cause or causes producing those extra cycles.

During program execution in a modem microprocessor pipeline, instructions often suffer execution delays because of cache misses, branch mispredictions, memory access delays, and so forth, each of which result in extra cycles, sometimes also called delay cycles. A detailed understanding of which types of delays are producing large numbers of delay cycles would allow the programmer, or the compiler or other software tuning tool, to modify the program's instruction stream so as to reduce the number of delay cycles and, as a result, cause the program to execute faster. A performance monitor is intended to provide such understanding.

Known prior art performance monitors monitor by simple counting the number of cache misses, branch mispredictions, and so forth. But not all such events contribute to a program's visible delay, due to parallel and super-scalar execution capabilities of today's processor pipelines, decoupling buffers used between multiple serial pipelines in today's processors to separate one pipeline from another, and so forth. For example, it is possible for a data cache miss to occur without causing a pipeline delay, if the use of the data happens long after the data actually is available for use. Consequently, simply counting the number of miss-events does not provide an accurate picture of where cycles are being wasted.

Some known prior art performance monitors include hardware counters that simply count certain events, such as data cache misses, in isolation without regard to whether or not the event counted actually produces a pipeline delay. In some known prior art performance monitors monitoring is done by software simulation. Such simulation is slow, and cannot be used effectively on present day and future processor pipelines capable of parallel and super-scalar execution.

The present invention tracks actual delay cycles in real-time, at the full frequency of the microprocessor, and is designed to work with advanced microprocessor architectures that feature speculative execution, pipelining, super-scalar execution, and/or decoupling buffers. Moreover, the present invention does not slow down the execution of the computer program's instruction stream, because the invention operates in parallel to the main processor pipeline. When implemented in the CPU hardware, the present invention eliminates the need for software simulation, and gives accurate, real-time breakdowns of processor stall cycles. This information may then be used by software for tuning operating systems and application programs. Examples of such software include Vtune®, a program commercially available from Intel Corporation, and profile-guided compilers.

Thus the present invention is directed to overcoming, or at least reducing, the effects of one or more of the problems mentioned above.

SUMMARY OF THE INVENTION

In one aspect of the present invention, a performance monitor is provided for use in parallel with a main processor pipeline. The performance monitor includes one or more silos (a series of storage elements) which receive a plurality of delay signals from the pipeline, which delay signals indicate particular reasons for extra cycles being required.

The silos outputs certain signals, which are received by a prioritizer. The prioritizer prioritizes the signals it receives according to a particular prioritization scheme, and then outputs a number of prioritized signals. The prioritized signals are then received by a combiner which selectively combines the prioritized signals, and outputs signals providing relevant information, for example, the delay cycles actually caused by branch mispredictions, the delay cycles actually caused by execution latency, the delay cycles actually caused by data access delays, the delay cycles actually caused by instruction access delays, and so forth. The number of cycles in a particular signal can then be counted to give a total number of delay cycles for that particular reason for delay.

According to an aspect of the present invention, the prioritizing and the selective combining may be combined, may be performed in hardware, or may be performed under the control of programmable software. According to another aspect of the present invention, when the performance monitor has a single silo, there is no need for prioritizing and selected combining.

According to another aspect of the present invention, each silo has a number of individual stages, one stacked above the other. In one embodiment of the present invention, each stage includes a single latch. In another embodiment, instead of a latch a flip-flop is used. What is required is structure capable of storing a single bit, and thus any memory element or anything that is capable of storing information may be used. A silo as used in this patent is intended to encompass all such structure. Each silo receives one or more of the delay reason signals provided by the main processor pipeline, and outputs a staged signal. The staged signal from each of the silos are the signals received by the prioritizer.

According to another aspect of the present invention, the number of stages in a particular silo is directly related to the position in the microprocessor pipeline of the pipeline stage producing a particular delay signal. The main processor pipeline includes a number of pipeline stages, including an ith stage and a jth stage, and this jth stage may provide one or more jth delay reason signals. In the pipeline, K stages separate the ith stage of the pipeline from the jth stage (not counting either the ith stage or the jth stage). One of the silos of the performance monitor has K+1 stages, that is, one more stage than the number of stages separating the ith stage and the jth stage of the pipeline, and, a jth delay reason signal from the jth stage of the pipeline is provided to the top-most stage, that is, the K+1st stage, of this silo. According to another aspect of the present invention, one of the silos has more than K+1 stages, and the jth delay reason signal from the pipeline is provided to the K+1st stage of the silo, and to each stage of the silo above the K+1st stage to the top of that silo. According to yet another aspect of the present invention, the number of stages in a particular silo is one less than the number of stages from the beginning of the pipeline to the last stage in the pipeline where a delay can occur, and a jth delay reason signal is provided to all the stages in that silo.

According to another aspect of the present invention, cycle accounting for a microprocessor includes receiving certain of the delay reason signals, staging each of the received signals and outputting staged signals, prioritizing the staged signals and outputting prioritized signals, and selectively combining the prioritized signals and outputting signals. According to one aspect of the present invention, the cycle accounting is carried out at the frequency of the microprocessor. According to another aspect of the present invention, the cycle accounting is carried out in parallel to the microprocessor pipeline. And according to yet another aspect of the present invention, the cycle accounting continues to be carried out when the microprocessor pipeline experiences delays.

According to still another aspect of the present invention, a delay cycle accounting system is provided. The system includes a main processor coupled to a performance monitor. The processor includes a pipeline which operates in parallel to the performance monitor. The performance monitor is coupled to the pipeline, and includes one or more silos, each of which receives at least one of a plurality of delay reason signals provided by the pipeline. Each silo outputs a staged signal, and all such staged signals are received by a prioritizer. The prioritizer selectively prioritizes the staged signals it receives, and outputs at least two prioritized signals, at least one of which is a logical combination of at least two of the staged signals. A combiner receives the prioritized signals, and outputs at least one signal that is a logical combination of at least two of the prioritized signals. A counter receives this signal and counts the number of cycles the condition has occurred, and outputs a signal indicating this cycle count.

The present invention can deal with overlapping delays, such as overlapping stall conditions, delays that cause multiple pipeline effects, such as multi-cycle bubbles, flushes resulting from branch mispredictions, and so forth, and delays caused in decoupling buffers and elsewhere. The present invention is not limited to any particular microprocessor, and can readily be implemented for different instruction sets and pipeline microarchitectures that support speculative execution and super-scalar instruction execution.

The present invention is of significance importance to future microprocessors, because as microprocessor pipelines become deeper, faster, and wider, and the relative speed of memory becomes slower, detailed performance analysis becomes increasingly important. The present invention enables real-time break-down of program execution time, and allows measurement and analysis of performance bottlenecks on complex software systems in real-time. Large complex workloads, such as computer operating systems and databases, which cannot readily be simulated, can be effectively optimized using the present invention. These and other benefits will become evident as the present invention is described more fully below.

BRIEF DESCRIPTION OF THE DRAWINGS

Other objects and advantages of the invention will become apparent upon reading the following detailed description and upon reference to the drawings in which.

Figure 1:
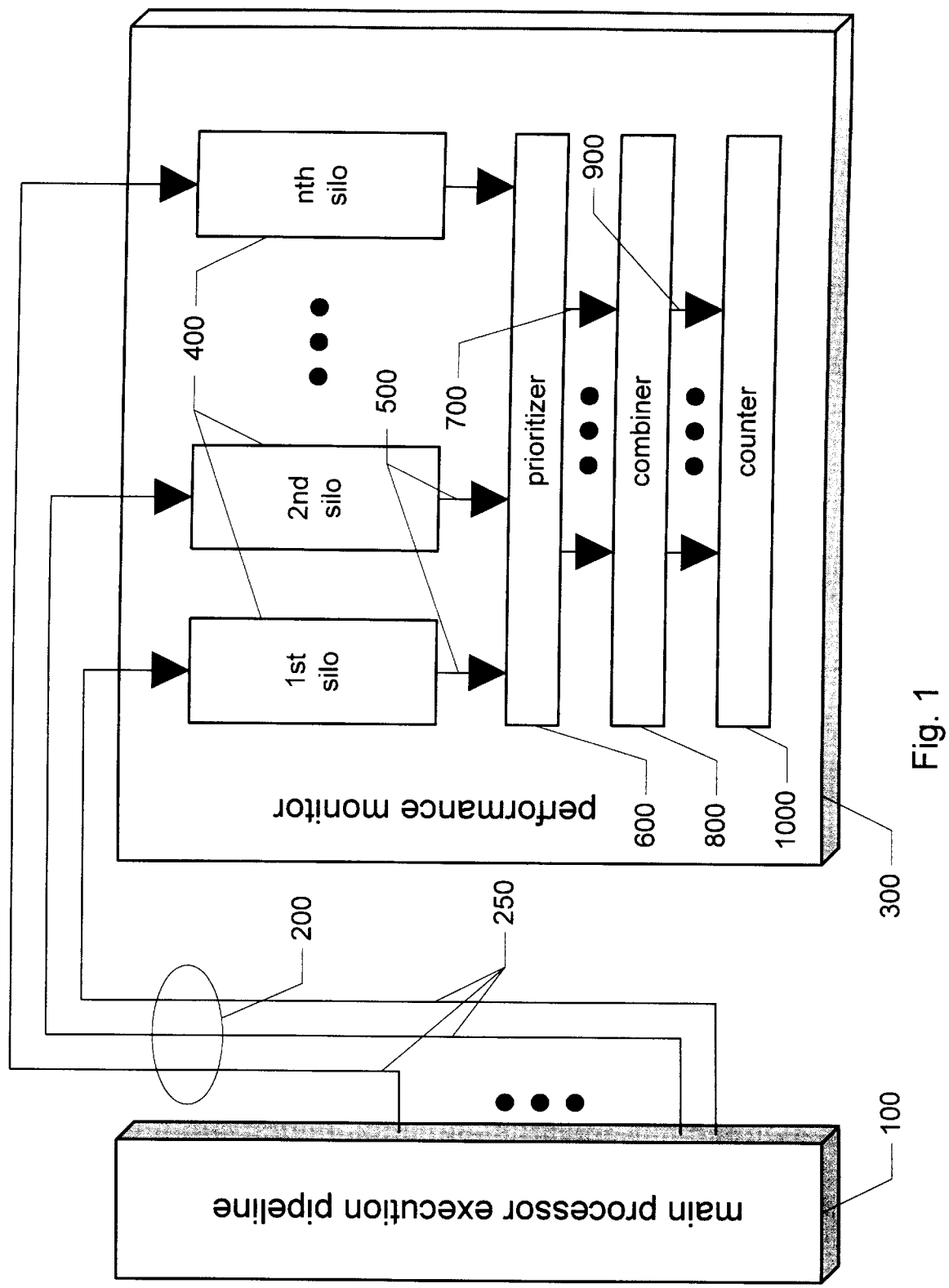
FIG. 1 is a schematic block diagram of a delay cycle accounting system according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, and in particular to FIG. 1, there is shown in block diagram form a main processor pipeline 100 which provides a plurality of delay reason signals 200, over a plurality of lines 250, to a performance monitor 300. The performance monitor includes a plurality of silos 400. Each silo receives one or more of the plurality of delay reason signals 200, and outputs a staged signal, over one of a plurality of lines 500, to a prioritizer 600. The prioritizer receives the stage signals, prioritizes them, and outputs a plurality of prioritized signals, via a plurality of lines 700, to a combiner 800. The combiner selectively combines various ones of the prioritized signals, and outputs one or more signals via one or more lines 900. A counter 1000 receives at least one signal, counts the number of cycles contained in that signal, and outputs a signal indicating that cycle count.

In advanced microprocessor architectures that feature speculative execution, pipelining, super-scalar execution, and/or decoupling buffers, various types of delay cycles exist, for example, simple pipeline stalls that inject a single bit into a silo of the present invention, pipeline bubbles that inject a number of bits into a silo of the present invention, and pipeline flushes that inject a large number of bits into a silo of the present invention.

A stall, in general, is a signal which, if asserted to a pipeline stage, requires that the stage not update its output state, that any data fed forward to the next stage is invalidated, and, when the signal is disasserted (signals are either asserted or disasserted), that the output state is updated as if the stall signal was never asserted. A flush, in general, is a signal which, if asserted to a pipeline stage, requires that either the stage invalidate its output state or the output state be ignored by all receivers, and, when the signal is retired, that the output state is updated as if the flush signal was never asserted. The flush signal is unlike the stall signal in that often the stage may not have to deal with invalid incoming data for several clock cycles.

Theoretically, an instruction should complete execution in a number of cycles corresponding to the number of pipeline stages in the microprocessor. If it takes longer, then there should be a reason for the extra cycles. By the time an instruction retires, it has experienced all of the delays which it is going to experience. Consequently, any effect which causes an instruction to retire more than the number of pipeline stages after it was fetched is considered a delay. These effects may be directly attributable to the current instruction, or they may be a function of a previous instruction. There are several events which occur during an instruction's path through the pipeline which can cause its issue to be delayed, and these events can happen at many different clock cycles.

Various types of delays and examples will now be described. Although these examples are given for consecutive operations, the conditions can exist between arbitrary operations fetched in the same clock cycles as the two operations, called "op1" and "op2", in the examples. The clear boxes represent cycles without any delays for the given instruction; the shaded boxes represent cycles during which a delay is detected.

The normal flow of two instructions in a particular microprocessor pipeline is shown below.

| clock | 1 | 2 | 3 | 4 | 5 | 6 | 7 | 8 | 9 |
|---|---|---|---|---|---|---|---|---|---|
| op1 | FE1 | FE2 | BUF | DEC | IS | RR | EX1 | EX2 | WB |
| op2 | FE1 | FE2 | BUF | DEC | IS | RR | EX1 | EX2 | WB |

-continued

FE1 - Instruction Fetch 1 stage
FE2 - Instruction Fetch 2 stage
BUF - Instruction Buffer stage
DEC - Instruction Decode stage
IS - Instruction Issue stage
RR - Register Read stage
──────────────── Instruction Issue
EX1 - Instruction Execution 1 (non-memory ops) stage
M0 - L0 Memory Pipe (memory ops)
M1 - L1 Memory Pipe (memory ops)
EX2 - Instruction Execution 2 stage
WB - Write Back (Retire) stage Various delays may include:

Instruction Cache Delay: An instruction cache delay occurs when an instruction does not exist in the instruction cache. This delay can last for an undetermined number of cycles (however long it takes to load the instruction into the cache). In the following example, the second instruction incurs a five cycle penalty due to an I-cache miss (clocks 3–7).

| clock | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| op1 | FE1 | FE2 | BUF | DEC | IS | RR | EX1 | EX2 | WB | | | | | |
| op2 | FE1 | FE2 | FE2 | FE2 | FE2 | FE2 | FE2 | BUF | DEC | IS | RR | EX1 | EX2 | WB |

←──── counted delay ────→

Fetch Window Delay: A processor has limited bandwidth to the instruction cache. Every time the program's execution path crosses the cache line boundary, the next instruction's fetch is delayed for one cycle. This translates into a one cycle delay in issue.

Taken Branch Delay: Any time a branch is taken, the target instruction is delayed for one cycle from the optimal case. The optimal case is that both the branch and its target are fetched in the same cycle, in which case there would be no penalty. The microprocessor having the pipeline illustrated above does not allow multiple non-consecutive lines to be fetched per cycle, so there is a one cycle penalty for the taken branch. This is similar to the fetch window delay, except that this is for out-of-line accesses.

Dynamic Branch Bubble: In the ideal case, the dynamic branch predictor could instantaneously determine the next address. If the next address is in-line, no action is taken, and so no penalty occurs. If the next address is not in-line, whatever time has been spent making the dynamic prediction has been lost. For the illustrated pipeline, two cycles are lost.

Static Taken Branch Bubble: The static branch bubble is directly analogous to the dynamic branch bubble. The static prediction, however, is made in the instruction buffer (BUF) stage, and for the illustrated pipeline three cycles are lost.

Branch Mispredict/Serialization: A mispredicted branch is redirected after the instruction execution 2 (EX2) stage. Consequently, all of the cycles between op1's fetch and its EX2 stage are lost. If the branch is taken, then one of these cycles is due to the taken branch penalty, and the remaining eight cycles are due to a branch mispredict.

Execution Pipe Delay: When two operations have a data dependency, and the first operation has a non-unit latency, the second operation may be held up in the register read (RR) stage waiting for the data to become available.

Data Cache Miss Delay: When two operations have a data dependency, and the first operation is a load, and it misses in the data cache, the second operation will wait in the register read (RR) stage until the data is retrieved from the cache hierarchy. This stall is also detected elsewhere, but it is only counted after op1 has finished going through the data cache. Thus, execution delays and data cache miss delays are distinct for any one instruction.

Figure 2:
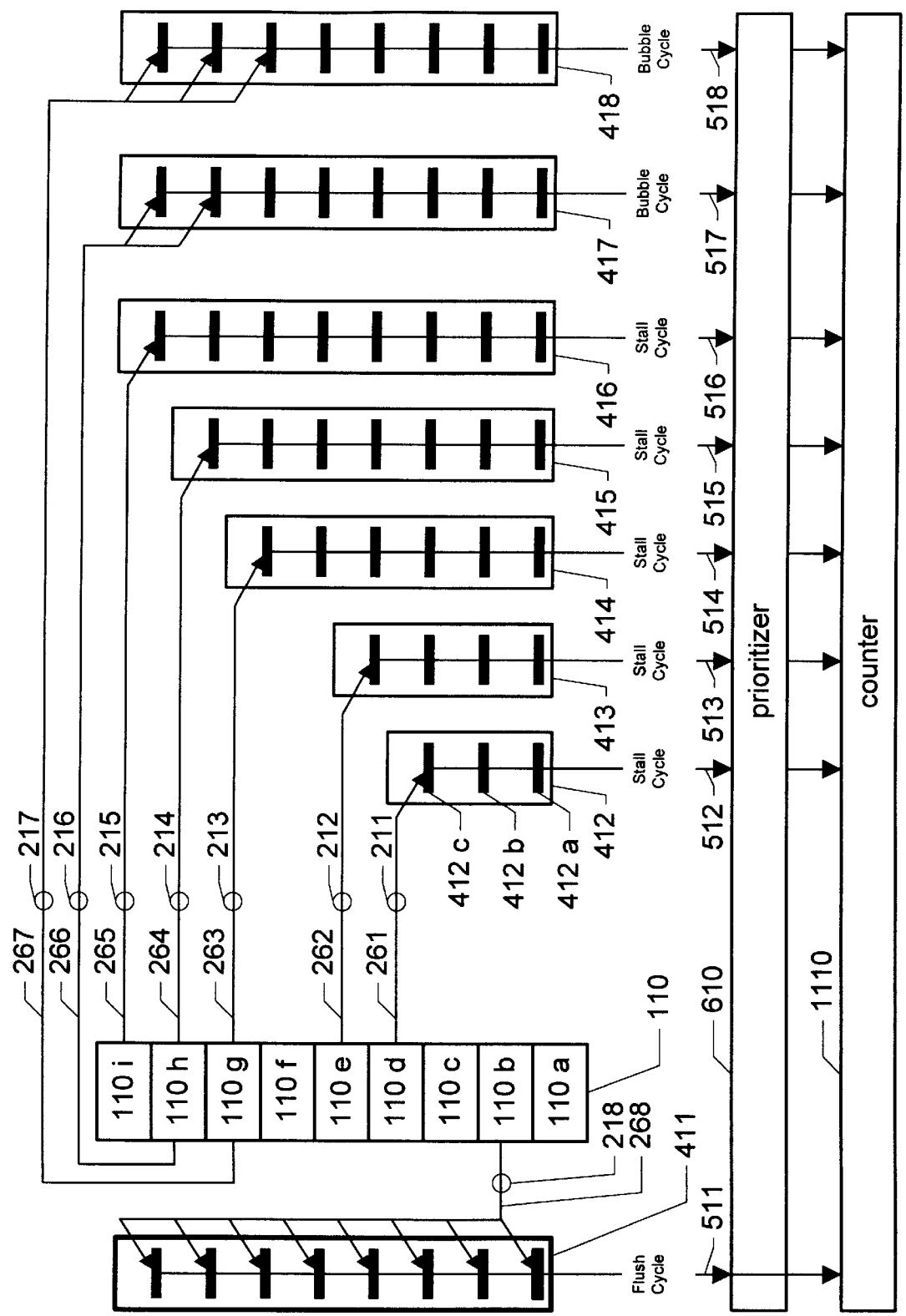
FIG. 2 is a schematic diagram of a delay cycle accounting system according to one embodiment of the present invention.

Referring now to FIG. 2, in one embodiment of the present invention, a main processor pipeline 110 includes nine stages, 110a, 110b, 110c, . . . , 110i. The pipeline begins at the stage 110i, and ends at the stage 110a.

The illustrated embodiment includes eight silos, 411, 412, 413, . . . , 418. Each silo includes, in series, a plurality of stages, with each stage including a single latch. For example, the silo 412 includes three latches, 412a, 412b, and 412c; the latch 412a is the bottom-most latch in the silo 412, and the latch 412c is the top-most latch.

For ease in illustration and description in this patent, the beginning stage of a pipeline and of a silo has been illustrated as, and described as, the top-most stage, and the end stage has been illustrated as, and described as, the bottom-most stage. As is apparent, top-most is merely a first or earlier stage, and bottom-most is merely an end or later stage.

Various of the stages 110a–110i of the pipeline 110 provide one or more delay reason signals to various of the silos. Three types of delay cycles are illustrated: simple pipeline stalls; pipeline bubbles; and pipeline flushes.

Simple pipeline stalls are pipeline delays that eject a single bit into a silo, where that silo contains as many latches as the pipeline boundary that is being stalled is removed from the stage 110a of the pipeline, as described more fully below. If a simple stall lasts for multiple cycles, multiple consecutive stall bits are inserted into the silo.

For example, the stage 110d of the pipeline 110, provides a delay reason signal 211, via a line 261, to the top-most latch 412c of the silo 412. The stage 110d of the pipeline 110 is separated from the bottom-most stage of the pipeline, stage 110a, by two stages, namely stages 110b and 110c; consequently, the stage 110d is the third stage above the bottom-most stage 110a of the pipeline 110. The delay reason signal 211 from that stage 110d is therefore provided by a pipeline stage that is the third stage above the pipeline's bottom-most stage. Consequently, the silo that receives the delay reason signal 211 must have three stages; that is, the number of stages in the silo receiving the delay reason signal must be one more than the number of stages contained in the pipeline between the pipeline stage producing the delay reason signal and the bottom-most stage of the pipeline.

Similarly, the stage 110e of the pipeline 110, provides a delay reason signal 212, via a line 262, to the top-most latch in the silo 413; because there are three pipeline stages between the stage 110e providing the delay reason signal 212 and the bottom-most stage 110a of the pipeline, the silo 413 has four latches. The delay reason signals 213, 214, and 215 are similarly provided from the pipeline stages 110g, 110h, and 110i, to the top-most latches in the silos 414, 415, and 416, via the lines 263, 264, and 265, respectively.

Pipeline bubbles are pipeline delays that last for more than one cycle. For example, a dynamic branch bubble introduces two dead cycles into a processor pipeline, and a static branch bubble introduces three dead cycles. Such bubbles result in more than one latch in a silo being set every time such a bubble condition occurs. In general, a two cycle pipeline bubble injects two bits into the delay accounting silo, a three cycle pipeline bubble injects three bits, a four cycle pipeline bubble injects four bits, and so forth.

Illustrated in the embodiment of FIG. 2, are a two cycle pipeline bubble, and a three cycle pipeline bubble. The stage 110h of the pipeline 110 provides a two bit bubble signal 216 to the silo 417, via a line 266. A two bit branch bubble delay signal results in the two top-most latches in a silo being set every time that bubble condition occurs. Consequently, the delay reason signal 216 is fed to the two top-most latches in the silo 417.

The stage 110g of the pipeline 110 provides a three bit bubble signal 217 to the silo 418, via a line 267. A three bit branch bubble delay signal results in the three top-most latches in a silo being set every time the condition occurs. Consequently, the delay reason signal 217 is fed to the three top-most latches in the silo 418.

Pipeline flushes are pipeline delays that flush multiple pipeline stages, for example, branch mispredictions. When such delays occur, bits are injected into every silo latch that corresponds to a flushed pipeline stage. In general, flushes that flush "x" pipeline stages, inject "x" bits into the delay accounting silo.

The embodiment illustrated in FIG. 2 contains one pipeline flush. The stage 110b of the pipeline 110, provides a eight bit flush delay signal 218, via a line 268, to the silo 411.

Note that in the case of a one cycle delay signal, the delay signal is injected into the top-most stage of a silo, and the silo has a number of stages equal in number to one more than the number of stages between the pipeline stage providing the delay reason signal and the bottom-most stage of the pipeline, that is, the pipeline stage where the architectural state is being committed, sometimes called the write back stage (shown as stage 110a in FIG. 2). For a two cycle delay signal, the delay signal is injected into the two top-most stages of a silo, and the silo has a number of stages equal in number to two more than the number of stages between the pipeline stage providing the delay reason signal and the write back stage. For a three cycle delay signal, the delay signal is injected into the three top-most latches of a silo, and the silo has a number of stages equal in number to three more than the number of stages between the pipeline stage providing the delay signal and the write back stage. Thus, for an "n" cycle delay signal, the signal is injected into the "n" top-most stages of a silo, and the silo has a number of stages equal in number to "n" more than the number of stages between the pipeline stage providing the delay signal and the write back stage of the processor.

With continued reference to FIG. 2, the staged signals outputted from the silos 411, . . . , 418 are provided to a prioritizer 610 via a plurality of lines 511, 512, . . . , 518. The prioritizer 610 provides output signals to a counter 1110. For example, in the illustrated embodiment of FIG. 2, the staged signal from the silo 411 contains flush cycle information. It is provided via the line 511 to the prioritizer 610, where it is fed directly through to the output. This signal is received by the counter 1110 which counts the number of cycles in the staged signal, thereby providing the number of cycles during which a flush condition has been asserted. For a single flush lasting eight cycles, the number counted is eight. Similarly, for a single bubble lasting three cycles the number is three, for two bubbles each lasting three cycles, the number is six, and so forth.

Figure 3:
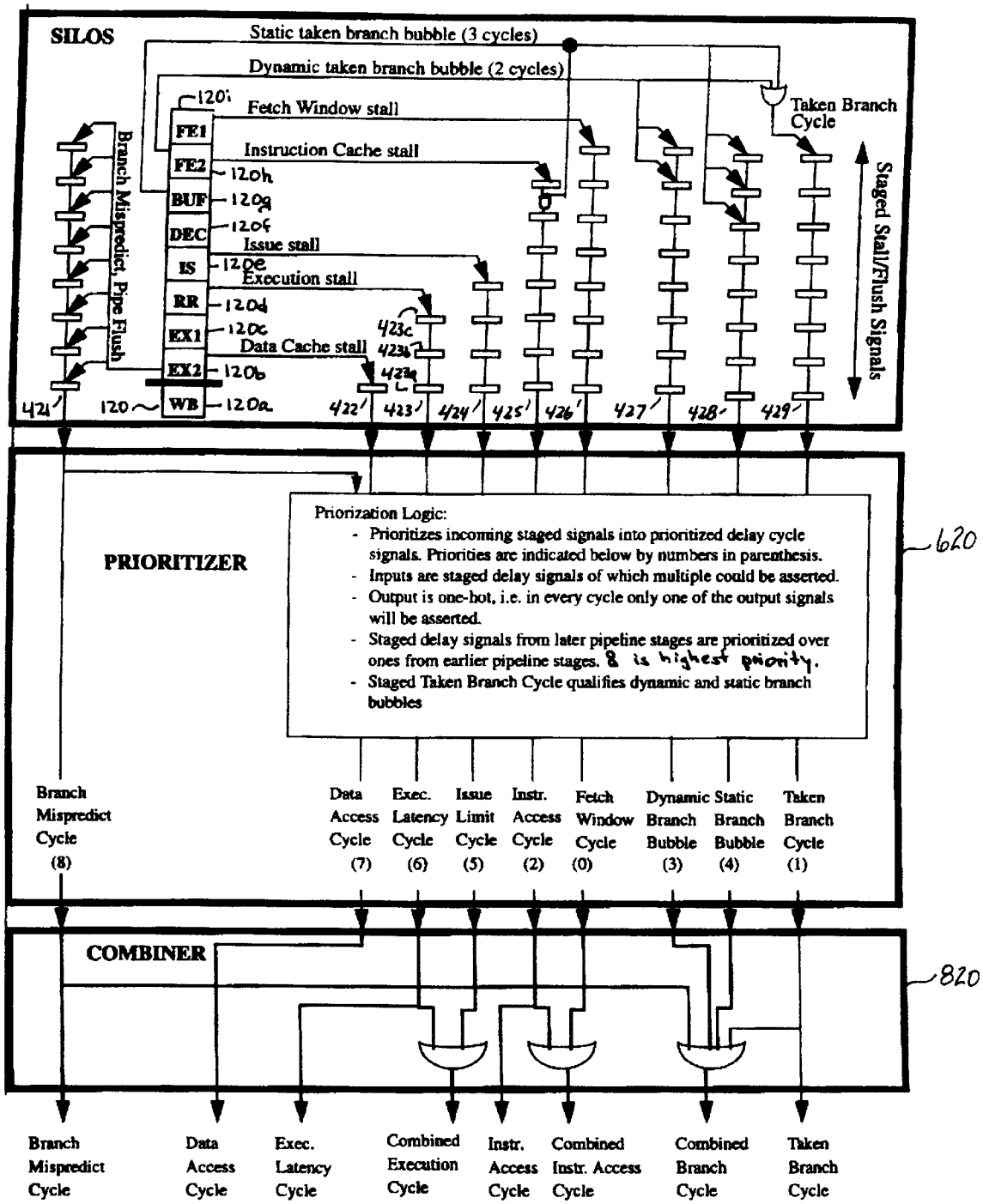
FIG. 3 is a schematic diagram of a delay cycle accounting system according to another embodiment of the present invention.

Referring now to FIG. 3, in another embodiment of the present invention, a main process pipeline 120 includes nine stages, 120a, 120b, 120c, . . . ,120i. The stage 120a is a write back (WB) stage, the stage 120b is an instruction execution 2 (EX2) stage, and the stage 120c is an instruction execution 1 (EX1) stage. Stages 120d–120i are a register read (RR) stage, an instruction issue (IS) stage, an instruction decode (DEC) stage, an instruction buffer (BUF) stage, an instruction fetch 2 (FE2) stage, and an instruction fetch 1 (FE1) stage, respectively. The illustrated pipeline begins with the instruction fetch 1 (FE1) stage 120i, which delivers an instruction pointer to the instruction cache. The pipeline ends with the write back (WB) stage 120a; once an instruction completes the write back stage of the illustrated pipeline, it is guaranteed to update the architectural processor state.

With continued reference to FIG. 3, the illustrated embodiment includes nine silos, 421, 422, . . . , 429. Each silo includes one or more latches. For example, the silo 423 includes three latches, 422a, 422b, and 422c, and the silo 422 includes a single latch.

Various of the stages 120a–120i of the pipeline 120 provide one or more delay reason signals to various of the silos 421–429, via a plurality of delay signal lines.

Examples of simple pipeline stalls are illustrated in FIG. 3. These include the read register (RR) stage 120d of the pipeline 120 injecting a single bit into the silo 423, the instruction issue (IS) stage 120e injecting a single bit into the silo 424, the fetch instruction 2 (FE2) stage 120h injecting a single bit into the silo 425, the instruction fetch 1 (FE1) stage 120i injecting a single bit into the silo 426, and the instruction execution stage 2 (EX2) injecting a single bit into the one latch stage silo 422.

The register read (RR) stage 120d of the pipeline 120 is separated from the write back stage 120a, by two stages (stages 102b and 102c); consequently, the register read stage 102d is the third stage above the write back stage 102a. The register read stage provides an "Execution Stall" signal to the top-most latch of the silo 423. Because this stall signal is provided from the stage in the pipeline located three stages before the write back stage, the silo 423 requires three stages of latches. Similarly, the delay reason signal from the instruction issue (IS) stage 120e of the pipeline to the top-most latch in the silo 424, comes from the stage of the pipeline located four stages above the write back stage 120a and, consequently, the silo 424 requires four latch stages.

Pipeline bubble delays are also illustrated in the FIG. 3 embodiment. For example, a "Static Taken Branch Bubble (3 cycles)" signal, from the pipeline stage 120g, is coupled to the three top-most latches of the silo 428. And, a "Dynamic Taken Branch Bubble (2 cycles)" signal, from the pipeline stage 120h, is coupled to the two top-most latches of the silo 427. Delay signal may be coupled to more than one silo; for example, the signal from pipeline stage 120g is also coupled to the top-most latch of the silo 429 and, via logic, to the second-from-the top latch in solo 425.

A pipeline flush is also illustrated in the FIG. 3 embodiment. A "Branch Mispredict, Pipe Flush" signal, from the instruction execution 2 (EX2) stage 120b, injects a bit into every latch in the silo 421.

Multiple delay cycles often occur, in real-world processes, at the same time in different stages of the pipeline. Delays are often data dependent, and can last for a variable number of cycles. This results in stalls overlapping each other in time, and makes it difficult to identify specific reasons for a particular delay cycle. To solve this problem, one particular embodiment of the present invention uses a static prioritization scheme in which delay cycles that occur closer to the architectural commit or write back stage (WB) 120a of the processor pipeline 120 illustrated in FIG. 3, are given priority over delay cycles that are introduced in earlier stages, that is, further away from the write back stage. A prioritizer 620 includes a number of logic gates which receive various signals from the silos 421–429.

The illustrated prioritizer 620 has a left-to-right static prioritization scheme that, in the case of concurrent delay cycles, has the left-to-right prioritization indicated in the block 620. In any cycle in which none of these prioritized delay cycle indicator signals are true, there is no pipeline condition that is delaying the computation, and the pipeline is operating at full efficiency. The prioritized signals are outputted from the prioritizer 620 and coupled to a combiner 820. Prioritization schemes different from the one illustrated in FIG. 3 may be used including programmable logic. In the illustrated embodiment, in any particular clock cycle only one of the nine illustrated prioritized delay cycle indicator signals may be true. In another embodiment, one or more may be true.

In one embodiment of the present invention, the prioritized signals are received by circuitry contained in the combiner 820 illustrated in FIG. 3. This circuitry includes five straight-through connections, and three logic gates which receive as inputs various of the prioritized signals outputted by the prioritizer 620. The combiner 820 outputs five straight-through signals, a "Branch Mispredict Cycle" signal, a "Data Access Cycle" signal, an "Execution Latency Cycle" signal, an "Instruction Access Cycle" signal, and a "Taken Branch Cycle" signal. The combiner 820 also outputs three combined signals, a "Combined Execution Cycle" signal, which is a combination of the "Execution Latency Cycles" signal and the "Issue Limit Cycle" signal, a "Combined Instruction Access Cycle" signal, and a "Combined Branch Cycle" signal. Other combinations may be made and outputted. In practice, counters are expense elements and therefore the quantity of available counters in a process are limited. For this reason, combinations of signals are useful. The present invention provides for the making and outputting of such useful combinations.

In one embodiment of the present invention, each of the prioritized output signals of the prioritizer 620 drives a counter which count the number of cycles in which a particular one of these signals is true. In another embodiment of the present invention, each of the output signals of the combiner 820 drives a counter which counts the number of cycles in which a particular one of these signals is true.

In each of the silos illustrated in FIGS. 2 and 3, the delay reason signals received from the pipeline, are staged down toward the end of the silo, synchronously with the pipeline. Synchronously, as used in this patent, means that the signals are staged down the silos, concurrently with pipeline operation, such that the bits travel down the silos in every clock cycle, and the bits traveling down the silos are not affected by delays in the pipeline.

All of the delay reasons are prioritized after the write back stage, before being counted to sort out major performance penalties. Since the silo 425 of FIG. 3 combines stalls from different stages, some logic is included in that silo.

In the illustrated embodiments, a static prioritization scheme is hard-wired into the performance monitor. The prioritization scheme need not be static; it may be dynamic. In an embodiment of the present invention programmable logic is used for the priorifizer, and the prioritization scheme contained in software and/or in microcode. In another embodiment, programmable logic is used for the combiner. In yet another embodiment, the prioritizer and combiner are combined. In yet another embodiment, the performance monitor has a single silo and, consequently, there is no need for a prioritizer or a combiner.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A performance monitor for use in parallel to a main processor pipeline, said pipeline providing a plurality of delay reason signals comprising:
   at least two silos, each to receive one of a plurality of delay reason signals provided by the pipeline, said at least two silos including:
      a first silo to receive a first delay reason signal which is one of said plurality of delay reason signals and to output a first staged signal; and
      a second silo to receive a second delay reason signal which is another one of said plurality of delay reason signals and to output a second staged signal;
   a prioritizer, coupled to said first silo and said second silo, to receive said first and second staged signals and to output a plurality of prioritized signals; and
   a combiner, coupled to said prioritizer to receive said plurality of prioritized signals and to output at least one combined signal.

2. The performance monitor of claim 1 wherein said combiner includes circuitry to output at least one straight-through signal.

3. The performance monitor of claim 2 wherein said said combiner outputs at least four signals, including a branch-mispredict cycle signal, an execution-latency cycle signal, a data-access cycle signal and an instruction-access cycle signal.

4. The performance monitor of claim 1 wherein said combiner includes circuitry to output at least one combined signal.

5. The performance monitor of claim 1 wherein said first silo and said second silo include a plurality of latches.

6. The performance monitor of claim 1 wherein said first silo includes M stages in series.

7. The performance monitor of claim 6
   wherein the main processor pipeline includes a plurality of pipeline stages, including a first stage and a jth stage, separated from each other by K stages, in which said jth stage provides a jth delay reason signal as one of the plurality of delay reason signals; and
   wherein the number of stages M in said first silo is equal to K+1 and the jth delay reason signal is provided to the K+1 th stage in said first silo.

8. The performance monitor of claim 6
   wherein the main processor pipeline includes a plurality of pipeline stages, including a first stage and a jth stage, separated from each other by K stages, in which said jth stage provides a jth delay reason signal as one of the plurality of delay reason signals; and
   wherein the number of stages M in said first silo is greater than K+1 and the jth delay reason signal having a delay of more than one cycle is provided to at least the K+1 th stage in said first silo.

9. The performance monitor of claim 8 wherein the jth delay reason signal is provided to the K+1 th stage of said first silo, to the Mth stage of said silo and to each stage of the silo between the K+1st stage and the Mth stage.

10. The performance monitor of claim 6
    wherein the main processor pipeline includes a plurality of pipeline stages, including a jth stage, in which said jth stage provides a jth delay reason signal as one of the plurality of delay reason signals; and
    wherein the number of stages in said first silo is one less than the number of stages in said pipeline and the jth delay reason signal is provided to at least one stage in said first silo.

11. The performance monitor of claim 6 wherein
    said second silo includes P stages in series,
    the number of stages P not being equal to the number of stages M.

12. The performance monitor of claim 6
    wherein the main processor pipeline includes a plurality of pipeline stages, including a first stage and a jth stage, separated from each other by K stages, in which said jth stage provides a jth delay reason signal as one of the plurality of delay reason signals; and
    wherein the number of stages M in said first silo is greater than K+1 and the jth delay reason signal is provided to one or more stages of one or more silos.

13. The performance monitor of claim 1 having eight silos to generate eight prioritized signals.

14. The performance monitor of claim 1 wherein each said silo includes a plurality of stages.

15. The performance monitor of claim 14 wherein each said stage of each silo comprises a latch.

16. The performance monitor of claim 14 wherein each said stage of each silo comprises a flip-flop.

17. The performance monitor of claim 14 wherein each said stage stores one or more bits.

18. The performance monitor of claim 1 wherein the prioritizer and the combiner are combined as a single unit.

19. The performance monitor of claim 1 wherein the prioritizer is comprised of a programmable logic circuit.

20. The performance monitor of claim 19 wherein the prioritizer has a prioritization scheme determined by software.

21. The performance monitor of claim 1 wherein the combiner is comprised of a programmable logic circuit.

22. The performance monitor of claim 21 wherein the combiner has a combining scheme determined by software.

23. A delay cycle accounting system comprising:
    a main processor, having a pipeline to provide a plurality of delay reason signals; and
    a performance monitor coupled to operate in parallel with said pipeline by receiving the delay reason signals, said performance monitor including:
       a plurality of silos, each to receive at least one of the delay reason signals and to output its staged signal;
       a prioritizer, coupled to said silos, to receive said staged signals and to output a plurality of prioritized signals; and
       a combiner, coupled to said prioritizer, to receive said prioritized signals and to output at least one combined signal.

24. The delay cycle accounting system of claim 23 wherein said combiner includes circuitry to output at least one straight-through signal.

25. The delay cycle accounting system of claim 23 wherein said combiner includes circuitry to output at least one combined signal.

26. The delay cycle accounting system of claim 23 wherein each said silo includes a plurality of latches.

27. The delay cycle accounting system of claim 23 wherein said pipeline includes L stages and one of said silos comprises M stages in series, in which each stage includes a latch.

28. The delay cycle accounting system of claim 27 wherein L and M are integers and L is greater than M.

29. The delay cycle accounting system of claim 27 wherein one of said silos includes P stages in series, in which each P stage includes a latch, the number of P stages not being equal to the number of M stages.

30. The delay cycle accounting system of claim 23 wherein said prioritizer includes at least one logic gate and said prioritized signals includes a signal that is a logical combination of said staged signals.

31. The delay cycle accounting system of claim 23 wherein said combiner includes at least one logic gate and said combined signal output from said combiner includes a logical combination of prioritized signals.

32. A method for cycle accounting in a microprocessor having a plurality of delay reason signals comprising:

receiving at least N plurality of the delay reason signals;

staging each of the received N delay reason signals to output N staged signals;

prioritizing each of said N staged signals to output N prioritized signals; and combining selectively said N prioritized signals to output a combined signal.

33. The method of claim 32 wherein the combining said N prioritized signals includes outputting at least one straight-through signal.

34. The method of claim 33 wherein the outputting of at least one straight-through signal includes outputting a branch-mispredict cycle signal, outputting an execution-latency cycle signal, outputting a data-access cycle signal and outputting an instruction-access cycle signal.

35. The method of claim 32 wherein the combining of said N prioritized signals includes outputting a plurality of combined signals.

36. The method of claim 35 wherein the outputting the combined signals include outputting a combined branch cycle signal having branch-mispredict, taken branch, and dynamic/static branch bubble information;

outputting a combined execution cycle signal having execution-latency and issue-limit information; and outputting a combined instruction access cycle signal having instruction-access and fetch-window information.

37. The method of claim 32 further comprising operating the microprocessor at a particular frequency and performing the method for cycle accounting at said particular frequency of the microprocessor.

38. The method of claim 32 further comprising performing the method for cycle accounting in parallel to a pipeline of the microprocessor.

39. The method of claim 38, further comprising the performing the method for cycle accounting in synchronism with operation of said pipeline.

40. The method of claim 32, wherein the combining of said N prioritized signals further comprising counting a number of bits contained in said combined signal.

41. The method of claim 32 wherein only one of said N prioritized signals is true in a particular clock cycle.

42. The method of claim 32 wherein one or more of said N prioritized signals is true in a particular clock cycle.

43. A performance monitor for use with a processor having a pipeline which provides one or more delay reason signals comprising:

a plurality of silos each coupled to receive one or more of the delay reason signals from the pipeline and to output its staged signal;

a prioritizer coupled to said silos to receive the staged signals and prioritize the staged signals based on a selected priority scheme, said prioritizer generating as output one or more priority signals having priorities established by the priority scheme.

44. The performance monitor of claim 43 wherein each silo has at least one stage to store one or more bits.

45. The performance monitor of claim 43 further comprising a counter coupled to receive one of the staged signals and to count the number of bits contained in said staged signal.

46. The performance monitor of claim 43 wherein said prioritizer further comprising circuitry coupled to receive the staged signal from each of the silos and to output priority signals from said prioritizer based on the priority scheme.

47. The performance monitor of claim 46 further comprising logic circuitry which includes programmable logic coupled to said prioritizer to selectively combine the priority signals and output at least one combined signal.

* * * * *